United States Patent [19]
Brown

[11] Patent Number: 5,997,182
[45] Date of Patent: Dec. 7, 1999

[54] VEHICLE WHEEL HUB BEARING UNIT WITH A REMOVABLE SENSOR

[75] Inventor: Steven Frederick Brown, Farmington Hills, Mich.

[73] Assignee: SKF Industrie S.p.A., Turin, Italy

[21] Appl. No.: 08/963,043

[22] Filed: Nov. 3, 1997

[51] Int. Cl.[6] ................................................. F16C 19/08
[52] U.S. Cl. .............................................................. 384/448
[58] Field of Search .................................... 384/448, 446, 384/544, 589, 512

[56] References Cited

U.S. PATENT DOCUMENTS 5,564,839  10/1996  Ouchi et al. ............................ 384/448
5,816,711  10/1998  Gingrich .................................. 384/448

Primary Examiner—Lenard A. Footland
Attorney, Agent, or Firm—Merchant, Gould, Smith, Edell, Welter & Schmidt, P.A.

[57] ABSTRACT

A vehicle wheel hub bearing unit comprises:
a stationary, radially outer race having a portion projecting radially outwardly;
a rotatable, radially inner race;
an encoder fixed for rotation with the rotatable radially inner race in close proximity to the inboard side of a flange fast for rotation with the hub and projecting radially outwardly therefrom;
a sensor mount element fixed to the radially outwardly projecting portion;
a sensor body mounted in removable manner to the mount element and incorporating a sensor element facing in operation the encoder.

10 Claims, 3 Drawing Sheets

5,997,182

VEHICLE WHEEL HUB BEARING UNIT WITH A REMOVABLE SENSOR

FIELD OF THE INVENTION

The present invention refers to a wheel hub bearing unit for vehicles, of the kind fitted with a removable sensor for measuring the relative rotational speed between the rotating and stationary races of the bearing.

BACKGROUND OF THE INVENTION

At present there are known bearings of the above mentioned kind, in particular tapered roller bearing units, provided with a sensor screwed in a threaded radial bore formed in the radially outer, stationary race of the bearing. The sensor is located facing an encoder wheel which is fast for rotation with the radially inner, rotating race of the bearing and axially interposed between two sets of tapered roller elements, as shown in the axial cross sectional view of FIG. 1. Referring to this drawing, a wheel hub bearing unit comprises a hub 10 forming a radially outwardly projecting flange 11 provided with axially oriented bores 12 for fitting fastening members 13 for connecting to the wheel of the vehicle (not shown). The hub is fitted with a rolling contact bearing comprised of a radially outer stationary race 14, a pair of radially inner, axially flanked rotating half-races 15a, 15b, and two sets of tapered rollers 16a, 16b, radially interposed between the outer race 14 and the two inner half-races 15a, 15b, respectively. An encoder wheel 17 is fixed for rotation between the inner half-races 15a and 15b. Facing the encoder wheel 17 is a sensor 18 screwed in a bore 19 formed in the stationary, outer race 14 and oriented substantially radially.

This known solution, that on one side is advantageous in that the sensor is interchangable, has nevertheless some drawbacks.

Firstly, a problem arises in having to perform a substantially radial bore in the outer race of the bearing, as this kind of operation requires special drilling machinery that is not installed in present bearing processing lines. Further, the execution of the bore is complicated in that this operation also affects the hardened zones of the races. Also, the bore for accommodating the sensor must be performed and located precisely to prevent the sensor from contacting the encoder wheel that it is facing, but still the sensor has to be near enough to the encoder so as to be able to detect the magnetic pulses or magnetic field variations generated by the rotation of the encoder. Another inconvenience related to said prior art arrangements is that, in order to accommodate the encoder wheel between the two sets of tapered rollers, the relevant races have to be suitably spaced apart, whereby the bearing is considerably bulky in the axial dimension.

SUMMARY OF THE INVENTION

It is a primary object of the present invention to provide an improved hub bearing unit of the above discussed type, capable of avoiding the expensive conventional processing. Another significant object of the present invention is to provide a hub bearing unit exploiting a universal sensor with bearings of different sizes and shapes.

These and other objects are achieved by a vehicle wheel hub bearing unit comprising:

a stationary, radially outer race having a portion projecting radially outwardly:

at least one rotatable, radially inner race;

an encoder fixed for rotation with the rotatable radially inner race in close proximity to the inboard side of a flange fast for rotation with the hub and projecting radially outwardly therefrom;

a sensor mount element fixed to said radially outwardly projecting portion;

a sensor body mounted in removable manner to said mount element and incorporating a sensor element facing in operation said encoder.

BRIEF DESCRIPTION OF THE DRAWINGS

In order that the present invention may be well understood there will now be described a few preferred embodiments thereof, given by way of example, reference being made to the accompanying drawings, in which.

DESCRIPTION OF EXEMPLARY PREFERRED EMBODIMENTS

Figure 1:
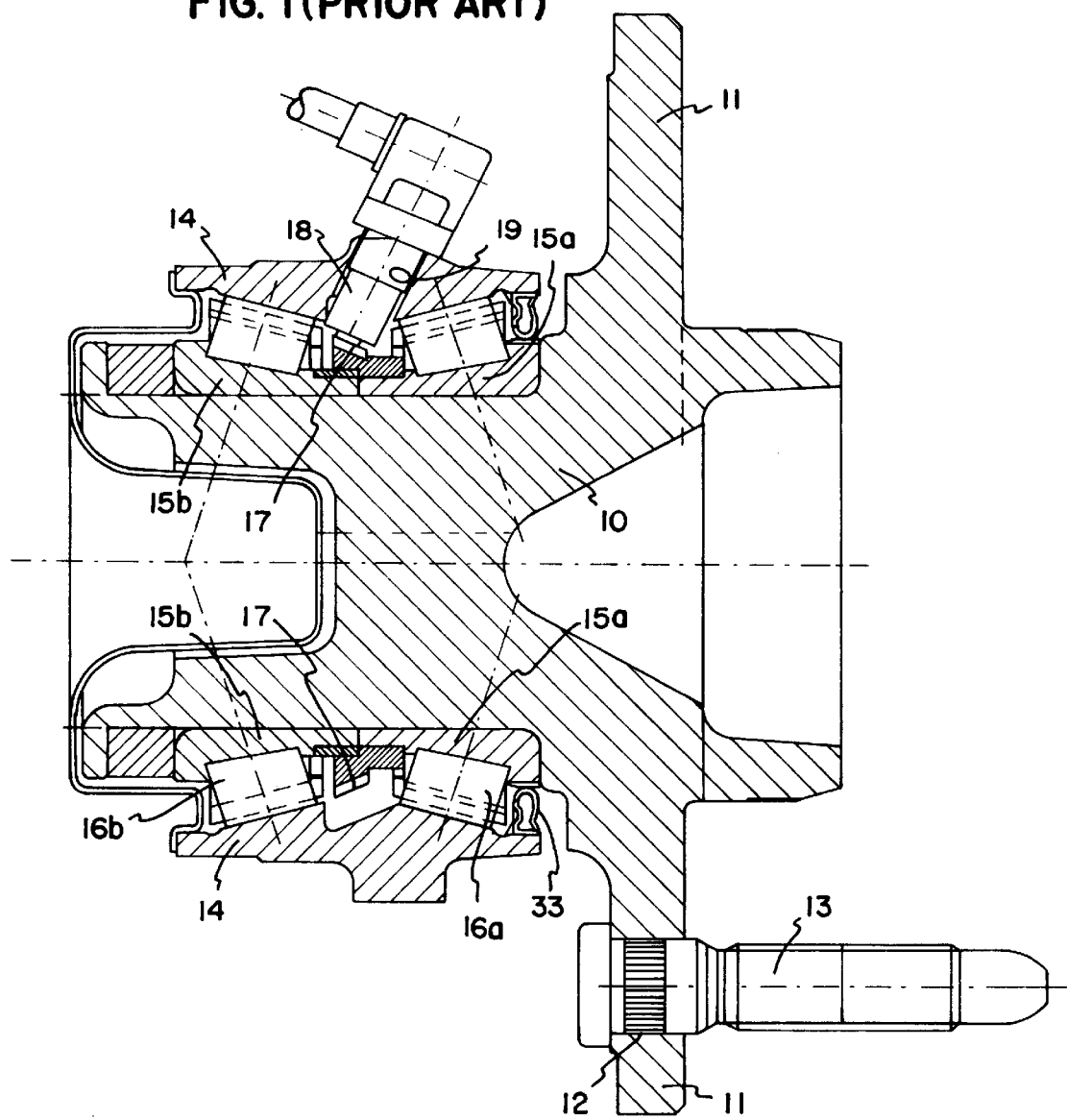
FIG. 1 is an axial cross sectional view of a hub bearing unit of known kind, as discussed in the introductory part of the description.
Figure 3:
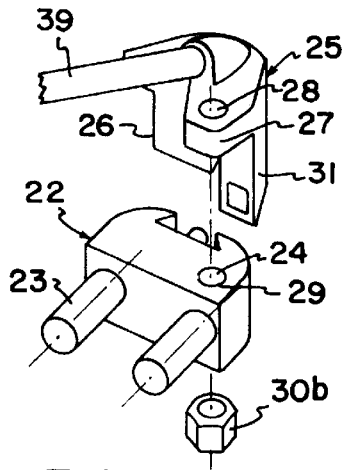
FIG. 3 is a perspective exploded view of a sensor carrier body and a mount element fitted to the bearing unit of FIG. 2.
Figure 2:
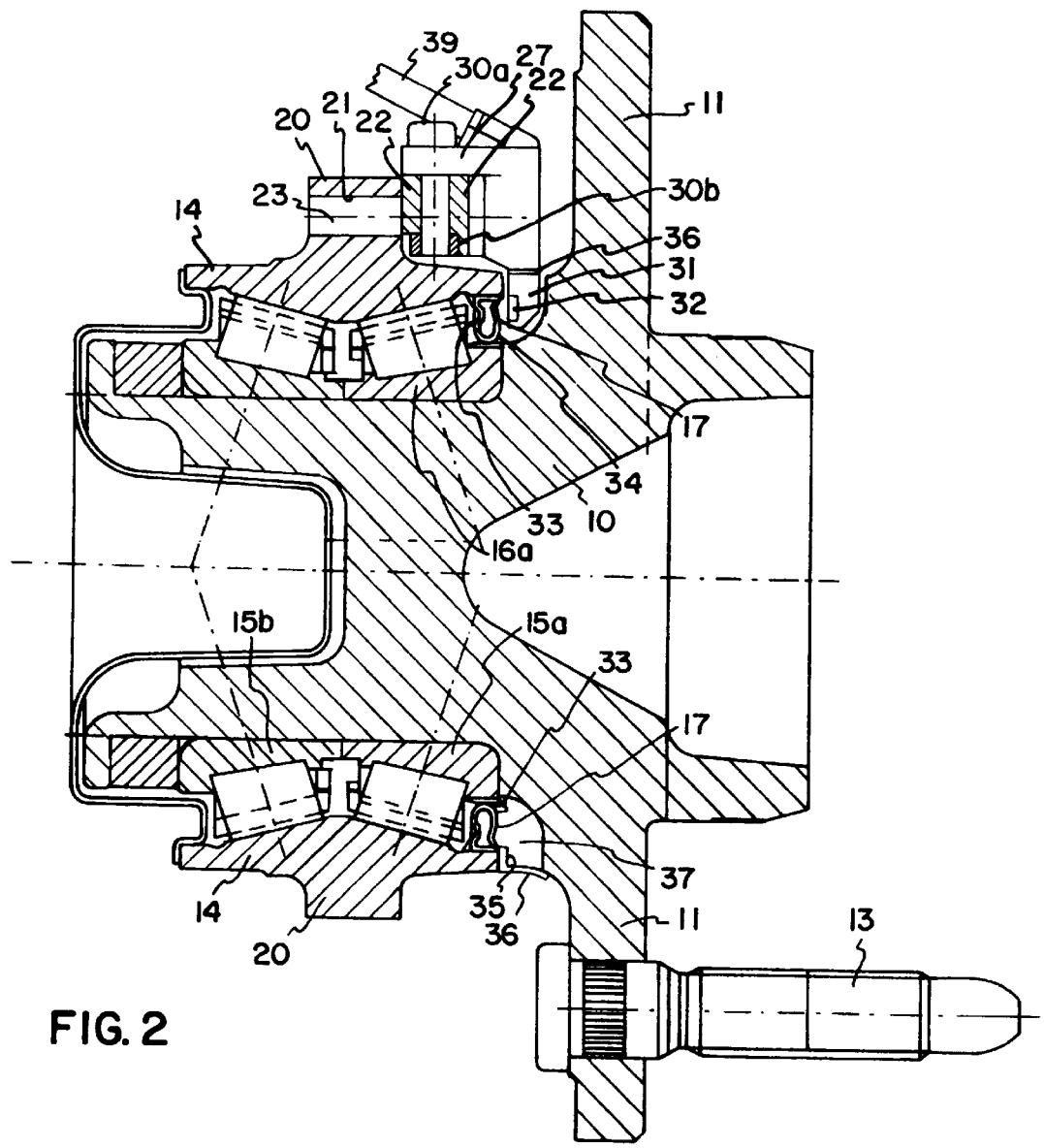
FIG. 2 is an axial cross sectional view of an embodiment of the hub bearing unit in accordance with the present invention.

Reference is made initially to FIG. 2, wherein the same reference numerals are used to designate parts already discussed with reference to FIG. 1 in the preamble of the present description. The radially outer stationary race 14 of the bearing forms a portion 20 projecting radially outwardly, such as a flange or an ear, in which there are formed one or more axially oriented bores 21, in this example two, for fixing a sensor mount element 22, separately shown in FIG. 3.

The mount element 22 is a block preferably made of sintered material (by pressing metal powder) or plastic (for example polyamide). Mount element 22 forms a pair of protuberances in the form of axial pins 23 and a radially oriented guiding slot 24. To secure the mount element 22 to the radial flange or ear 20, the pins 23 are forcefully fitted into bores 21 from the axially outer side near the radial hub flange 11. The ends of the protuberances 23 are then plastically deformed on the opposite side, for example by riveting if the mount element is made of sintered material, or heat riveting if made of plastic material, so as to prevent the mount element 22 from coming off radial portion 20.

In an alternative embodiment (not illustrated), the axial bores 21 and pin-shaped protuberances 23 are replaced by a single aperture and a protuberance of corresponding shape, still allowing the mount element 22 to be fixed to the radial portion 20 according to a preset orientation so as to determine univocally and precisely the position of the sensor with respect to the encoder wheel, as will be apparent herein after.

Mounted in removable manner to the mount element 22 is a sensor body 25, that is slipped radially into the mount guiding slot 24 by sliding in said slot a portion 26 of mount 25 of congruent shape. For example, the mount slot 24 and the sensor body portion 26 preferably have a dovetail shape that impedes relative axial movements between the body 25 and the mount element 22. The sensor body 25 forms an upper abutment 27 that abuts against the upper face of mount element 22. In the abutment 27 and the mount element 22 there are formed two radially aligned bores 28, 29, respectively, in which a fastener 30 is inserted, locking radially and in removable manner the body 25 to its mount 22 In the example illustrated in FIGS. 2 and 3, the fastener 30 is a bolt composed of a screw 30a and a nut 30b accommodated in the lower part of mount element 22. As apparent to those skilled in the art, the sensor body 25 can also be removably secured to the mount element 22 in a different way, for example by a quick coupling system exploiting snap-fit means of known design.

The sensor body 25 further forms a portion 31 radially projecting towards the inside from the abutment portion 27. Incorporated in the radially projecting portion 31 is a sensor element 32, which may be a magnetoresistance, a Hall effect cell, or another electrical sensor. An electric cable 39 co-molded to the sensor body 25 transfers the signal generated by the sensor element 32 to a network connected to an electronic processing unit (not shown) fitted on board of the vehicle.

Figure 6:
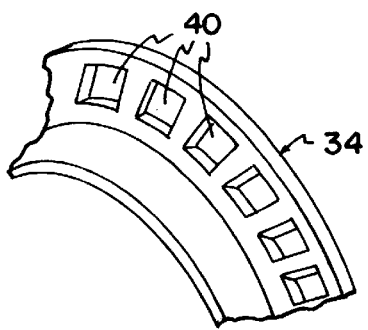
FIGS. 6 and 7 are a partial perspective view and a partial cross sectional view, respectively, of an annular insert fitted to the hub bearing unit of this invention.
Figure 7:
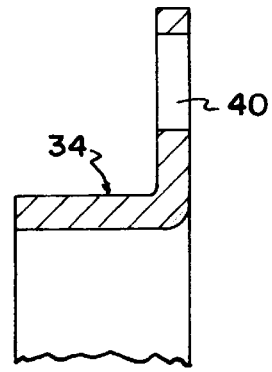
Figure 8:
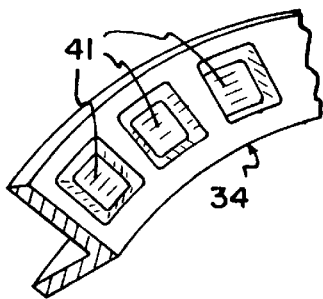
FIGS. 8 and 9 are a partial perspective view and a partial cross sectional view, respectively, of a variant of the annular insert of FIGS. 6 and 7.
Figure 9:
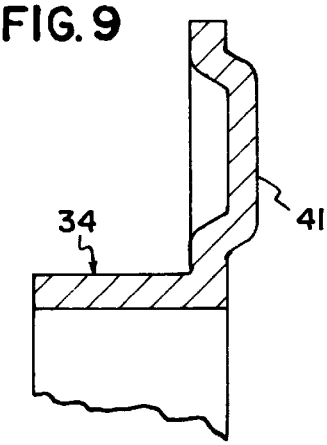

In the operational arrangement of FIG. 2, the sensor element 32 is axially facing an encoder wheel 17 incorporated in an axially outer sealing device 33 of the bearing, in close proximity to the inboard side of the hub flange 11. More particularly, in case the encoder wheel 17 is magnetized, this will be fixed to the axially outer face of a metal annular insert 34 fast for rotation with the inner half race 15a. Alternatively, in case the encoder wheel is of the non-magnetized type, the encoder may be directly formed by the same rotating metal insert 34 by forming therein apertures such as windows 40 (as shown in FIGS. 6 and 7) or recesses 41 (as shown in FIGS. 8 and 9), for example by punching.

Figure 4:
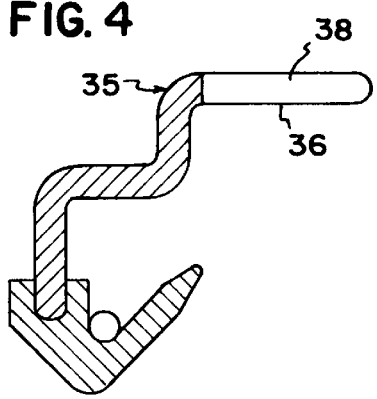
FIG. 4 is an axial cross sectional view, to an enlarged scale, of a metal annular shield included in a sealing device of the bearing of FIG. 2.

Still in accordance with the present invention, with reference also to FIG. 4, a stationary metal annular insert 35 of the sealing device 33 extends axially in close proximity to the hub flange 11 forming a substantially cylindrical wall 36 that defines with the flange 11 and the sealing device 33 an annular protection chamber 37 enclosing the sensor element 32 and the encoder wheel 17. In the cylindrical wall 36 there is formed an aperture or recess 38 of congruent shape with that of the cross-section of the sensor body projecting part 31, so as to allow to fit the sensor element facing the encoder wheel correctly. Although the wall 36 does not contact the hub flange 11 and therefore does not hermetically seal the chamber 37, it still is effective in forming a barrier that prevents metal particles from entering said chamber. As known, metal particles such as those released by the near brake are attracted by the magnetized encoder wheel and tend to deposit on this and the sensor element, thereby adversely affecting the operation of the relative speed measuring device.

Figure 5:
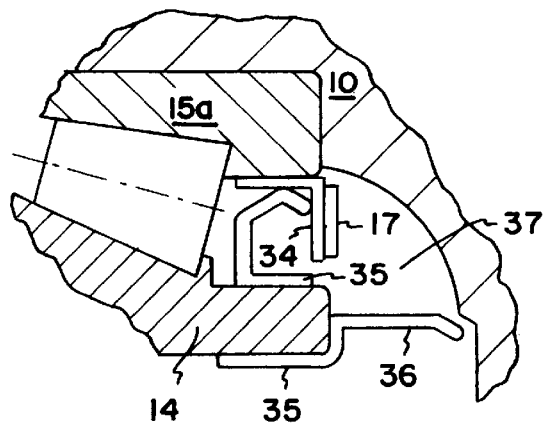
FIG. 5 is an axial cross sectional view, to an enlarged scale, of a variant of the embodiment of FIG. 4.

In an alternative embodiment illustrated in FIG. 5, the wall 36 can consist of a distinct metal element directly fixed to the bearing outer race 14.

As will be apparent, the hub bearing unit according to the present invention allows to reduce manufacturing costs considerably, particularly those costs for installation of machinery for drilling radial bores in the outer race of the bearing, and those costs concerning the time required for carrying out such special bores with accuracy. Instead, the axial bores 21 performed in the radial flange or ear 20 can be carried out with no particular difficulty and using machines currently installed in bearing processing lines.

The above described system for fixing the sensor allows to position the sensor with accuracy relative to the encoder wheel, as the dimensions of the mount element and the sensor body can be determined exactly in the series production of these elements.

A universal type of sensor body can be mounted to bearings of different kinds, changing only the mount element to adapt to the particular model of bearing. A mount element such as the one herein discussed, made of sintered or plastic material, is a low cost component that can be obtained through processes that can yield complex shapes not requiring further working.

It can also be noted from the comparison of FIGS. 1 and 2, that the bearing unit of the present invention is a more compact assembly. By moving the encoder wheel from the conventional position between the roller elements to the one herein proposed proximate to the hub flange, the two sets of rollers can be brought nearer. As a result, the bearing unit of this invention has a reduced axial bulk, is lighter, allows to save material for its construction and has a minor surface to be ground and turned.

Finally, the hub bearing unit of the present invention can also be applied to wheels where no sensor is provided, without having to close the conventional radial bore for housing the sensor.

Those skilled in the art may now make numerous uses of, and departures from, the above described embodiments without departing from the inventive concepts disclosed herein. For example, the present invention may be equally applied to ball bearings. Accordingly, the present invention is to be defined solely by the scope of the following claims.

I claim:

1. A vehicle wheel hub bearing unit comprising:
   a stationary, radially outer race having a portion projecting radially outwardly;
   at least one rotatable, radially inner race;
   an encoder fixed for rotation with the rotatable radially inner race in close proximity to the inboard side of a flange fast for rotation with the hub and projecting radially outwardly therefrom;
   a sensor mount element fixed to said radially outwardly projecting portion;
   a sensor body mounted in removable manner to said mount element and incorporating a sensor element facing in operation said encoder.

2. A hub bearing unit as claimed in claim 1, wherein in said projecting portion there is formed at least one seat for coupling with at least one corresponding locking means of said mount element, said seat and said locking means being so shaped as to univocally determine the position of the sensor element with respect to the encoder.

3. A hub bearing unit as claimed in claim 2, wherein said at least one seat consists of an axial aperture and said at least one locking means consists of a corresponding protuberance of said mount element.

4. A hub bearing unit as claimed in claim 3, wherein said at least one protuberance has an end portion of a plastically yieldable material for fixing said mount element to said seat.

5. A hub bearing unit as claimed in claim 1, wherein said sensor body is axially locked to said mount element by means of a radial slot coupling.

6. A hub bearing unit as claimed in claim 1, wherein said sensor body forms an inwardly radially projecting portion incorporating the sensor element.

7. A hub bearing unit as claimed in claim 1, wherein the encoder is fixed to an annular insert of a sealing device fitted to the bearing proximate to said hub flange.

8. A hub bearing unit as claimed in claim 1, comprising a sealing device for the bearing proximate to said hub flange, wherein said sealing, device comprises an annular insert fixed to the non rotating race, said non-rotating annular insert being fast with a substantially cylindrical wall extending axially proximate to said hub flange and defining with said hub flange and said sealing device an annular protection chamber containing the sensor element and the encoder, and wherein in said cylindrical wall there is formed a passage congruent with the cross section of an inwardly radially projecting portion of said sensor body incorporating the sensor element for positioning the sensor element facing said the encoder.

9. A hub bearing unit as claimed in claim 8, wherein said substantially cylindrical wall is formed as a unit with said non rotating annular insert.

10. A hub bearing unit as claimed in claim 8, wherein said substantially cylindrical wall is a distinct metal insert separate from said non rotating annular insert and directly fixed to the outer race of the bearing.

* * * * *